United States Patent [19]
Bostrom et al.

[11] 3,980,937
[45] Sept. 14, 1976

[54] FRACTIONAL HORSEPOWER GEAR MOTOR

[75] Inventors: Harry H. Bostrom, Chicago; John T. Joyce, Palatine, both of Ill.

[73] Assignee: Molon Motor and Coil Corporation, Rolling Meadows, Ill.

[22] Filed: Oct. 24, 1974

[21] Appl. No.: 517,406

[52] U.S. Cl. .......................... 318/466; 200/153 LA
[51] Int. Cl.² .......................................... H02P 3/00
[58] Field of Search ............... 318/265, 266, 466; 200/153 LA

[56] References Cited
UNITED STATES PATENTS

| | | |
|---|---|---|
| 2,230,191 | 1/1941 | Knight ............................. 318/466 |
| 2,312,077 | 2/1943 | Cowles ............................. 318/466 |
| 2,320,808 | 6/1943 | Lammeren et al. ............ 318/466 |
| 2,345,778 | 4/1944 | Lammeren et al. ............ 318/265 |
| 2,427,159 | 9/1947 | Poole ............................... 318/466 |
| 2,559,910 | 7/1951 | White ............................... 318/466 |

*Primary Examiner*—Gene Z. Rubinson
*Attorney, Agent, or Firm*—Charles F. Pigott, Jr.

[57] ABSTRACT

A fractional horsepower gear motor having improved switch actuating mechanism incorporated within the motor gearbox for operating an adjacent switch to control the rotation of the motor output shaft.

3 Claims, 9 Drawing Figures

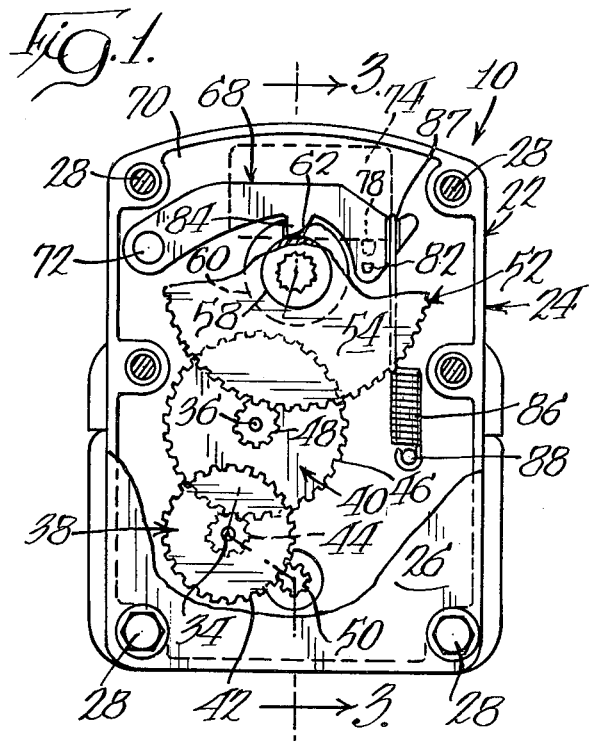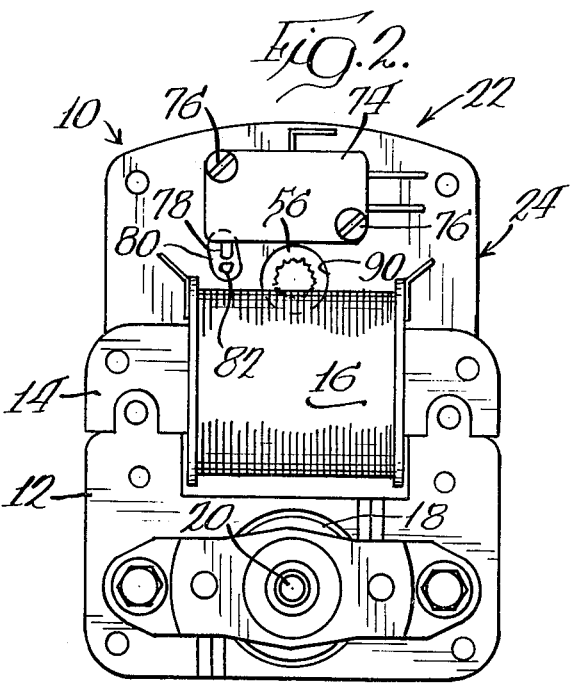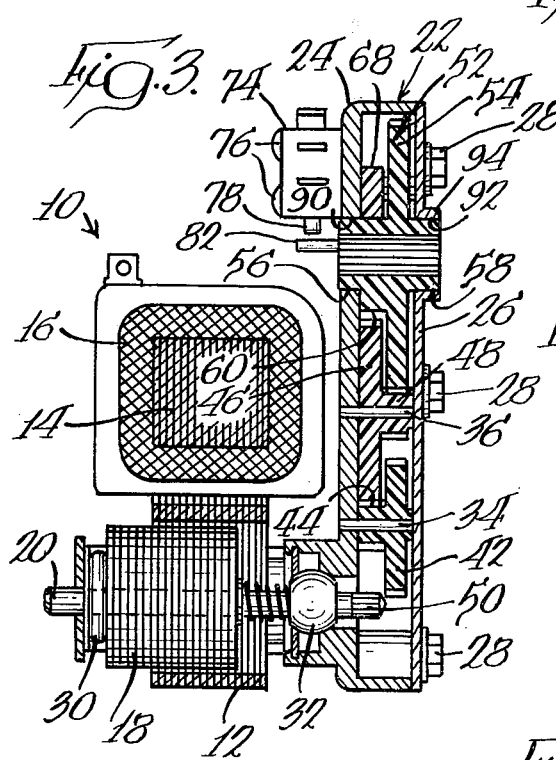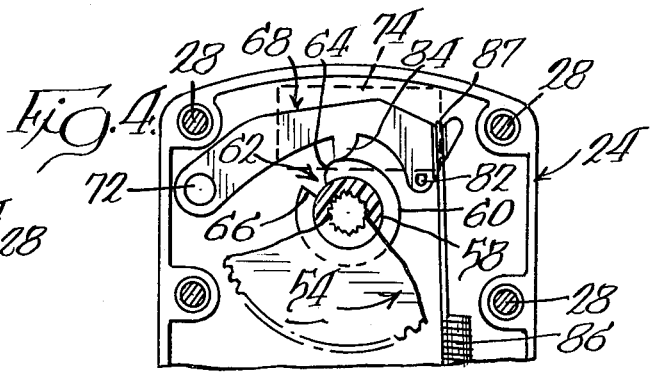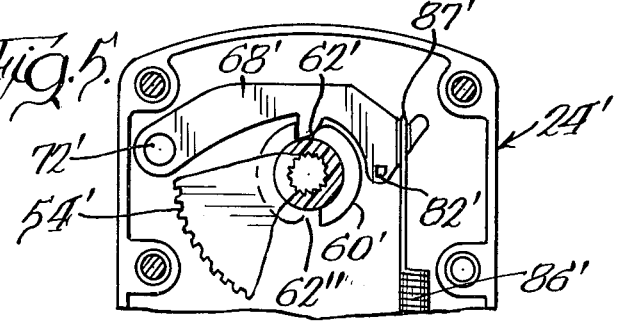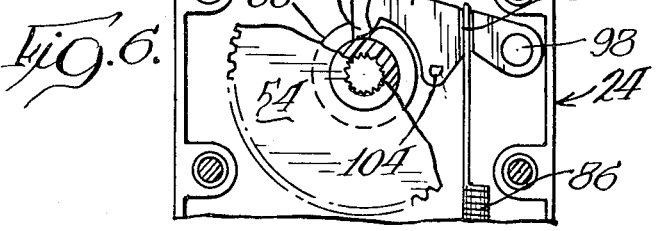

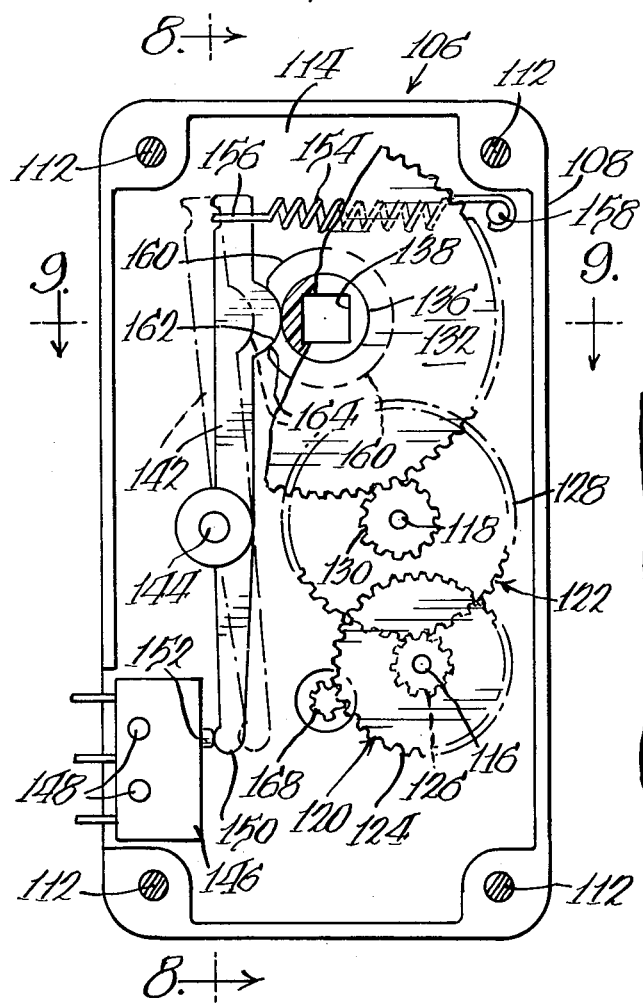
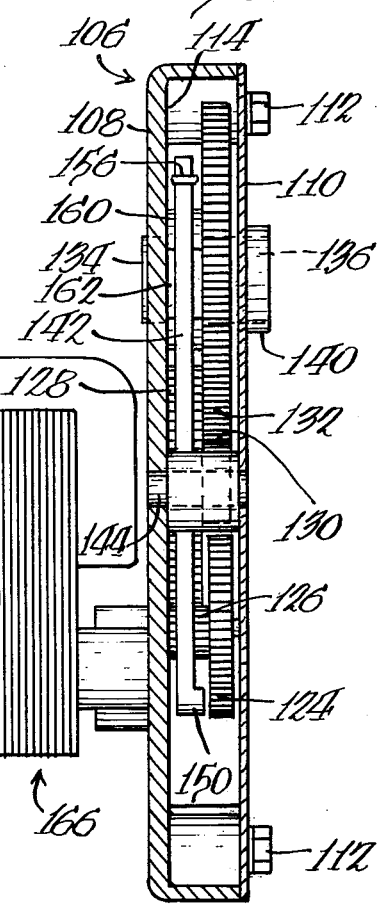
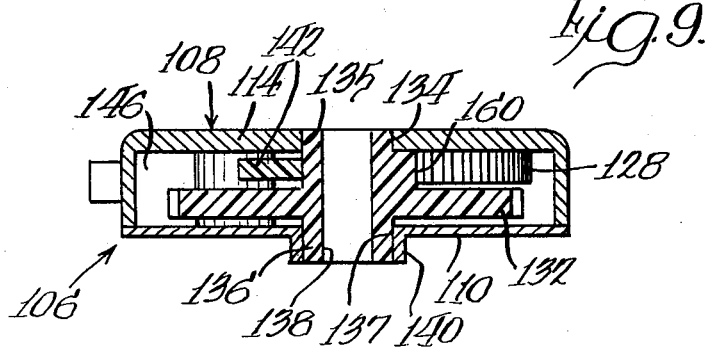

FRACTIONAL HORSEPOWER GEAR MOTOR

BRIEF SUMMARY OF THE INVENTION:

A fractional horsepower gear motor has numerous applications where it is required that the motor output shaft be rotated only a single revolution or fraction of a revolution during each operation of the motor. By way of example, such motors are often used to drive components in duplicating machines, vending machines, business machines, television tuners and the like. In such applications, the closing of a start switch initiates operation of the motor. As is conventional in the art, the start switch may be opened and the motor operation continued thereafter by a holding circuit controlled by a hold switch. The present invention relates to mechanism for actuating and de-actuating such a hold switch and thereby controlling the operation of the motor to provide for a single revolution of the output shaft or a predetermined fraction of a revolution during each operation of the motor.

It is therefore a general object of the present invention to provide an improved switch-actuating mechanism for controlling the operation of a fractional horsepower gear motor by automatically actuating a hold switch and subsequently de-actuating the same after one revolution or fraction of a revolution of the motor output shaft.

A more specific object of the invention is to provide improved switch-actuating mechanism as last abovementioned including a pivotally mounted index arm which is positioned within the motor gearbox and carries a switch-actuating member thereon, and a cam member formed on a hub portion of an output gear member for moving the lever between operative and inoperative positions.

The foregoing and other objects and advantages of the invention will be apparent from the following description of certain preferred embodiments thereof, taken in conjunction with the accompanying drawings.

DESCRIPTION OF THE DRAWINGS:

FIG. 1 is a plan view of a motor gear box embodying switch-actuating mechanism in accordance with the present invention, the gearbox cover plate being removed to illustrate the internal components;

FIG. 2 is a plan view, looking in the direction opposite to FIG. 1, showing a motor and gearbox assembly and a hold switch mounted on the outside of the gearbox housing for operation by switch-actuating mechanism located within the gearbox;

FIG. 3 is a sectional view taken substantially along the line 3—3 of FIG. 1;

FIG. 4 is a fragmentary plan view similar to FIG. 1 but showing a switch-actuating lever in its operative position in which it actuates an adjacent hold switch to maintain operation of the motor;

FIG. 5 shows a modification of the embodiment of FIGS. 1–4 where a pair of recesses are provided in a cam formed on the hub portion of an output gear to limit the rotation of the output shaft to one-half revolution during each operation of the motor;

FIG. 6 is a further modification of the embodiment of FIGS. 1–4 where a switch-actuating lever is mounted on an opposite side of the gearbox and is somewhat shorter in length due to its proximity to the actuator button of a snap-action type switch as shown in FIG. 2;

FIG. 7 is a plan view of a motor gear box embodying switch-actuating mechanism in accordance with an alternative embodiment of the invention, the gearbox cover plate being removed to illustrate internal components;

FIG. 8 is a sectional view taken substantially along the line 8—8 of FIG. 7; and FIG. 9 is a sectional view taken substantially along the line 9—9 of FIG. 7.

Now, in order to acquaint those skilled in the art with the manner of making and using our invention, we shall describe, in conjunction with the accompanying drawings, certain preferred embodiments of the invention.

DETAILED DESCRIPTION OF THE INVENTION:

Referring now to the drawings, FIGS. 1–4 show a fractional horsepower gear motor 10 comprising a stator frame 12, a laminated core 14, a coil 16, a rotor 18 and a rotor shaft 20. A gearbox casting 22 comprises a base 24 and a removable cover plate 26, the cover plate 26 being secured to the base 24 by a plurality of screws 28. The rotor shaft 20 is mounted for rotation in bearings 30 and 32 and is also axially slidable a limited amount as will be described more fully hereinbelow.

The gearbox base 24 includes a pair of gear pins 34 and 36 which are fixed in the base 24 and extend perpendicular thereto toward the cover plate 26. A first gear reducer 38 is rotatably mounted on the pin 34, and a second gear reducer 40 is rotatably mounted on the pin 36. The gear reducer 38 comprises a gear 42 having a pinion 44 integral therewith, and the gear reducer 40 comprises a gear 46 having a pinion 48 integral therewith. A drive pinion 50 which comprises an integral part of rotor shaft 20 is movable into driving engagement with a gear 42. It will be noted from FIG. 3 that when in its inoperative position the rotor shaft 20 is axially shifted away from the gear 42 so as to be disengaged therefrom. However, when the motor 10 is operated the rotor shaft 20 is shifted axially by solenoid action to engage the drive pinion 50 with the gear 42 of gear reducer 38. The foregoing rotor clutch arrangement is known in the art and is utilized to reduce over travel and permit free wheeling of the output.

The gear reducer 38 is rotated by the drive pinion 50 in the manner described above, and the pinion 44 on the gear reducer 38 meshes with the gear 46 of gear reducer 40 to rotate the latter. A relatively large output gear indicated generally at 52 comprises a gear 54 having a first integral hub member 56 projecting from one face of the gear and a second integral hub member 58 projecting from the opposite face thereof. An annular cam 60 is formed integral with the first-mentioned face of the gear 54 and extends around the axially inner portion of the hub 56, the cam 60 having a recess 62 defined on one side by a sloping surface 64 (see FIG. 4) and on the opposite side by a flat abutment surface 66, the cam 60 being utilized to control the operation of a motor switch as will be described more fully hereinafter.

As best shown in FIGS. 1 and 4, a lever or index arm 68 is located within the gearbox 22 adjacent to a bottom wall 70 of the base 24. The lever 68 is pivotally mounted at one end on a stud 72 which is integral with the wall 70 and projects upwardly therefrom. A switch 74 is mounted on the outside of the gearbox base 24, the switch being fixedly secured to the base by a pair of screws 76. In the particular embodiment being described, the switch 74 is of the snap-action type and includes an actuator button 78 located adjacent one end of a small elongated opening 80 formed in the gearbox base 24 (see FIG. 2). A small diameter pin 82 is carried on the outer end of the lever 68 and projects outwardly through the opening 80 for cooperation with the switch button 78.

The lever 68 has a projecting finger 84 on one side thereof for cooperation with the cam surface 60 on the output gear 52 and with the recess 62 formed in the cam surface. The lever 68 is biased in a clockwise direction as viewed in FIG. 1 by a tension spring 86 having one end attached to the outer end of the lever at 87 and its opposite end anchored to a pin 88 affixed to the gearbox base 24. The output gear 52 is rotatably mounted in the gearbox base 24 with the gear hub 56 journaled in a round opening 90 formed in the wall 70 of the base 24 and with the oppositely disposed gear hub 58 journaled in a round opening 92 formed in the gearbox cover plate 26. The plate 26 is formed with an outwardly projecting annular skirt portion 94 at the opening 92 so as to provide a more substantial bearing surface for the gear hub 58 as best shown in FIG. 3.

The operation of the motor switch mechanism illustrated in FIGS. 1–4 will now be described, and by way of example only it will be assumed that the output gear 52 is driven in a counterclockwise direction. The mechanism is shown in FIG. 1 in its normal or off position with the projection 84 of lever 68 disposed in the recess 62 of the cam 60, the lever 68 being yieldingly maintained in its clockwise position by the tension spring 86. Actuation of a motor start switch (not shown) initiates operation of the motor 10 causing the rotor shaft 20 to shift axially to the right as viewed in FIG. 3 to engage the drive pinion 50 with gear 42 of gear reducer 38. The rotor shaft 20 is also rotated in a clockwise direction as viewed in FIG. 1 causing counterclockwise rotation of gear reducer 38. The pinion 48 of gear reducer 38 drives gear reducer 40 in a clockwise direction, and the latter through engagement of its pinion 48 with output gear 52 drives the output gear in a counterclockwise direction.

Rotation of output gear 52 in a counterclockwise direction as viewed in FIG. 1 effects driving of any components associated with the motor 10 depending upon the particular application thereof. In certain applications, the output gear 52 may have an output shaft affixed thereto which extends outwardly through the opening 90 in the gearbox cover plate 26. In the particular embodiment illustrated, the hub members 56 and 58 on the output gear 52 are internally splined to receive a splined shaft (not shown) associated with auxiliary equipment to be driven by the motor 10.

As the output gear 52 is rotated in a counterclockwise direction as viewed in FIG. 1, the sloping surface 64 at the side of the cam recess 62 causes the projection 84 on lever arm 68 to ride outwardly onto the surface of cam 60 thereby shifting lever arm 68 to its counterclockwise position as shown in FIG. 4. The movement of lever arm 68 to the position shown in FIG. 4 causes the pin 82 carried on the end of lever arm 68 to depress switch button 78 and thereby actuate snap-action switch 74.

It should be understood that switch 74 is wired into the motor circuit (not shown) in conventional manner to function as a hold switch. Accordingly, actuation of a start switch (not shown) initiates operation of motor 10 causing rotation of the output gear 52 to the position shown in FIG. 4 thereby effecting actuation of hold switch 74. The start switch may be opened immediately thereafter, but as is well known in the art the motor 10 will continue to operate until a further de-actuation of hold switch 74. Accordingly, in the embodiment being described, the motor 10 will continue to operate until the lever arm 68 is returned to its clockwise position of FIG. 1 thereby moving the pin 82 out of engagement with the hold switch actuator button 78. It will thus be understood that after one complete revolution of the output gear 54, the projection 84 on lever arm 68 will again be moved into the recess 62 of cam 60 by the tension spring 86 thereby moving pin 82 away from switch button 78 to de-actuate hold switch 74 and deenergize the motor 10. Due to the rotor clutch action previously described, the drive pinion 50 will therefore be shifted axially to the inoperative position shown in FIG. 3.

It will be recognized that the foregoing mechanism may be utilized to provide for less than one complete revolution of the output gear 54 during each operation of gear motor 10. FIG. 5 shows a modification of the mechanism where an output gear 54' is formed with an integral cam 60' having two oppositely disposed recesses 62' and 62''. In the embodiment of FIG. 5, each operation of motor 10 will cause a counterclockwise rotation of output gear 54', but after one-half revolution of gear 54', the lever arm projection 84 will be forced into one of the oppositely disposed recesses 64' and 64'' thereby de-actuating hold switch 74 and deenergizing gear motor 10. Similarly, additional recesses may be formed in the cam 60' where it is desired to provide for less than one-half revolution of output gear 54' during each operation of gear motor 10.

In FIG. 6 there is shown an output cam 54 identical to the output cam disclosed in FIGS. 1–4. However, a lever arm 96 is provided which is shorter in length than lever arm 68 and is pivotally mounted at the opposite side of the housing base 24. A stud 98 is provided integral with the wall 70 of gearbox base 24, and lever arm 96 is pivotally mounted on stud 98 and is biased to a counterclockwise position as viewed in FIG. 6 by tension spring 86 which is connected to lever arm 96 at 100. A projecting finger 102 on the end of lever arm 96 rides on the cam surface 60 and falls into the recess 62 of the cam when the latter is in the off position as shown in FIG. 6. Moreover, lever arm 96 carries a switch-actuating pin 104 which projects through the elongated opening 80 in the base wall 70 and cooperates with the switch button 78 in the same manner as previously described in conjunction with FIGS. 1–4.

It will thus be understood that the embodiment of FIG. 6 functions in the same manner as the embodiment of FIGS. 1–4 except that due to the location of the lever arm 96 it is possible to reduce the length thereof and to connect the tension spring 86 intermediate the ends of the lever arm. It will of course be recognized that in the embodiment of FIG. 6 it is necessary to effect a greater angular movement of the lever arm 96 than in the embodiment of FIGS. 1–4 if it is desired to achieve the same travel of switch-actuating pin 104, since the pin is located closer to the pivot axis in the FIG. 6 embodiment.

FIGS. 7–9 illustrate still another embodiment of switch-actuating mechanism in accordance with the present invention. There is shown a gearbox indicated generally at 106 comprising a base member 108 and a cover plate 110 secured to the base by a plurality of screw fasteners 112. A bottom wall 114 of gearbox base 108 carries a pair of fixed gear pins or studs 116 and 118 on which a pair of gear reducers 120 and 122 are rotatably mounted. The gear reducer 120 includes a gear 124 and integral pinion 126, and the gear reducer 122 includes a gear 128 and integral pinion 130. An output gear 132 includes round hub portions 134 and 136 on its opposite faces which as best shown in FIG. 9 are journaled in openings 135 and 137 in the base wall 114 and cover plate 110 to rotatably mount the output gear. A square bore 138 is formed through hubs 134 and 136 to receive a drive member (not shown) associated with auxiliary equipment to be driven from the gearbox. In addition, cover plate 110 is provided with an annular skirt portion 140 around the opening 137 to provide increased bearing surface for the hub 136.

A lever or index arm 142 is pivotally mounted on a fixed pin 144 which projects from the base wall 114. A snap-action type hold switch 146 is mounted within the gearbox 106 and secured to the base wall 114 by rivets or the like 148. One end 150 of the lever arm 142 is located adjacent an actuator button 152 of the switch 146 for operation of the latter. A tension spring 154 has one end connected to the opposite end of lever 142 at 156, and the other end of the spring is anchored to a fixed pin 158 which projects from the gearbox bottom wall 114. The output gear 132 has a cam surface 160 formed on one face thereof as shown in FIG. 7, and a recess 162 in the cam surface cooperates with an arcuate projection 164 formed on lever arm 142.

The operation of the motor switch mechanism illustrated in FIGS. 7–9 will now be described. The lever 142 is shown in solid lines in FIG. 7 in its normal or off position with projection 164 disposed in the recess 162 of cam 160, the lever 142 being yieldingly maintained in its clockwise position by the tension spring 154. Actuation of a motor start switch (not shown) initiates operation of a motor 166 causing a rotor shaft drive pinion 168 to engage and drive gear 124 of gear reducer 120 in a counterclockwise direction as viewed in FIG. 7. The pinion 126 of gear reducer 120 drives gear 128 of gear reducer 122 in a clockwise direction, and the latter through its pinion 130 drives output gear 132 in a counterclockwise direction.

Rotation of output gear 132 in a counterclockwise direction as viewed in FIG. 7 effects driving of any components associated with the motor 166 depending upon the particular application thereof, the output being transmitted to a square shaft (not shown) positioned in the square bore 138 of the output gear. As the output gear 132 is rotated in a counterclockwise direction, the curved surface of the recess 162 causes the projection 164 on lever arm 142 to ride outwardly onto the surface of cam 160 thereby shifting lever arm 142 to its counterclockwise position as shown in dash lines in FIG. 7. The movement of lever arm 142 to the position shown in dash lines in FIG. 7 causes the arm end portion 150 to depress switch button 152 and thereby actuate snap-action switch 146.

As previously explained, switch 146 is wired into the motor circuit (not shown) in conventional manner to function as a hold switch. Thus, actuation of a start switch (not shown) initiates operation of motor 166 and drive pinion 168 and causes initial rotation of output gear 132 thereby effecting actuation of hold switch 146. The start switch may be opened immediately thereafter, but as is well known in the art the motor 166 will continue to operate until a further de-actuation of hold switch 146. The drive pinion 168 will therefore continue to operate until lever arm 142 is returned to its clockwise position of FIG. 7 thereby moving arm end portion 150 out of engagement with the switch actuator button 152. Accordingly, after one complete revolution of output gear 132, the projection 164 on lever arm 142 will again be moved into the recess 162 of cam 160 by the tension spring 154 thereby moving arm end portion 150 away from switch button 152 to de-actuate hold switch 146 and deenergize motor 166.

It will be understood that a switch-actuating arm or index arm as shown at 142 in FIG. 7 may be modified so as to comprise a bellcrank lever which is pivotally mounted and has two arms defining an included angle substantially less than 180 degrees. In the latter example, an end portion of one of the bellcrank arms may be utilized to actuate a switch, while a return spring may be anchored to the other arm, and of course one such arm must be associated with cam means or the like for moving the bellcrank lever between two positions as described hereinabove. It will further be understood that various types of switches may be utilized in accordance with the present invention. In the embodiments described herein, a snap-action type switch has been illustrated, although other types may be utilized such as a conventional leaf switch comprised of an assembly of insulators and flexible blade members. Moreover, the switch may be mounted on the outside of the gearbox as shown in FIGS. 1–4, or within the gearbox as illustrated in FIGS. 7–9.

From the foregoing description of various embodiments of the present invention, it will be seen that it is quite simple to control the rotation of an output shaft to one revolution or a fraction thereof and to stop the same in any desired position by utilizing a cam member which is formed directly on the output gear and thus located within the gearbox. By utilizing a pivotally mounted lever to actuate and de-actuate a holding switch, in combination with a cam formed on the output gear and a spring which biases the lever to a home position, it is not necessary to provide separate detent means, since the spring-loaded switch actuating arm will itself function as a detent to locate the output gear in a home position after each operation of the gear motor.

When it is desired to prevent the output cam and equipment driven thereby from being moved or manipulated in a direction opposite to the drive direction, the use of a flat abutment surface on the cam recess, such as shown at 66 in FIG. 4, will readily accomplish such an objective. In addition, by using a relatively strong tension spring in association with the switch-actuator arm or index arm, the output gear and equipment driven therefrom if manipulated slightly from its home position and released will be immediately returned to the home position due to the camming action afforded by the spring-loaded index arm and the cam recess. Moreover, in accordance with the present invention, it is not necessary to utilize cam means external to the gearbox, and by forming the cam means directly on the output gear, the stop position or positions of equipment driven from the gearbox is automatically correlated with the gear drive within the gearbox.

We claim:

1. In a gear motor of the type having a gear box containing a gear reducer and an output gear driven from a motor drive pinion or the like, where the output gear includes means for coupling the same to auxiliary apparatus for driving and positioning such apparatus in accordance with the rotational movement and position of the output gear, the improvement comprising, in combination, switch means secured in said gear box and operable when de-actuated to deenergize said motor, and output gear having cam means rigidly connected thereto to provide a positive rotational relation between said output gear and said cam means, said cam means comprising a cam surface rotatable about the axis of said output gear, a pivotally mounted lever having follower means in engagement with said cam surface, at least one recess formed in said cam surface to define off positions for said output gear and said auxiliary driven apparatus and to receive said follower means when said output gear is in a predetermined off position, switch-actuating means on said lever arm engageable with said switch means for operating the same, said lever arm being pivotally movable between a first position wherein it actuates said switch means when said follower means is engaged on said cam surface and a second position wherein said switch means is de-actuated thereby deenergizing said motor when said follower means is disposed in said recess thereby controlling the deenergization of said motor in accordance with predetermined positions of said output gear and auxiliary driven apparatus, and yieldable means biasing said lever arm into engagement with said cam means causing said follower means also to function in cooperation with said recess as a detent for location of said output gear and auxiliary driven apparatus in predetermined off positions after each operation of said motor.

2. An improvement in a gear motor as defined in claim 1, where said cam means is formed integral with said output gear.

3. An improvement in a gear motor as defined in claim 1, where said recess is defined on one side by an inclined surface and on the opposite side by an abutment surface, said abutment surface serving to prevent rotation of said output gear in a direction opposite to a normal drive direction when said output gear is in said off position with said follower means disposed in said recess.

* * * * *

UNITED STATES PATENT AND TRADEMARK OFFICE
CERTIFICATE OF CORRECTION

PATENT NO. : 3,980,937
DATED : September 14, 1976
INVENTOR(S) : Harry H. Bostrom; John T. Joyce It is certified that error appears in the above-identified patent and that said Letters Patent are hereby corrected as shown below:

In the Claims:

Claim 1, column 7, line 4, "in" should be changed to --on--; and

Claim 1, column 7, line 6, "and" should be changed to --an--.

Signed and Sealed this

Fifth Day of April 1977

[SEAL]

Attest:

RUTH C. MASON
Attesting Officer

C. MARSHALL DANN
Commissioner of Patents and Trademarks